United States Patent
Lambert et al.

(10) Patent No.: US 8,971,942 B2
(45) Date of Patent: Mar. 3, 2015

(54) ASSISTED LOCATION-BASED WIRELESS SPECTRUM ALLOCATION

(75) Inventors: Paul A. Lambert, Mountain View, CA (US); Sameer Bidichandani, Los Gatos, CA (US)

(73) Assignee: Marvell World Trade Ltd., St. Michael (BB)

( * ) Notice: Subject to any disclaimer, the term of this patent is extended or adjusted under 35 U.S.C. 154(b) by 381 days.

(21) Appl. No.: 13/418,934

(22) Filed: Mar. 13, 2012

(65) Prior Publication Data

US 2012/0238304 A1    Sep. 20, 2012

Related U.S. Application Data (60) Provisional application No. 61/452,475, filed on Mar. 14, 2011.

(51) Int. Cl.
| | | |
|---|---|---|
| *H04W 72/04* | (2009.01) | |
| *H04B 7/00* | (2006.01) | |
| *H04W 16/14* | (2009.01) | |
| *H04W 64/00* | (2009.01) | |
| *H04W 84/18* | (2009.01) | |

(52) U.S. Cl.
CPC ............ *H04W 72/048* (2013.01); *H04W 16/14* (2013.01); *H04W 64/00* (2013.01); *H04W 84/18* (2013.01)
USPC ............... 455/509; 455/452.1; 455/456.1; 455/515

(58) Field of Classification Search
CPC ............................... H04W 72/04; H04W 4/06
USPC ............... 455/509, 452.1, 450, 456.1, 456.2, 455/456.3, 41.2, 454, 458, 67.11, 466, 515; 370/329
See application file for complete search history.

(56) References Cited

U.S. PATENT DOCUMENTS

| | | | |
|---|---|---|---|
| 4,310,856 | A | 1/1982 | Poetsch |
| 4,740,831 | A | 4/1988 | Rhodes |

(Continued)

FOREIGN PATENT DOCUMENTS

| | | |
|---|---|---|
| GB | 2410653 | 8/2005 |
| WO | WO-98/37703 A2 | 8/1998 |

(Continued)

OTHER PUBLICATIONS

International Search Report and Written Opinion from the International Searching Authority dated May 8, 2012 for Application No. PCT/US2012/028918; 16 pages.

(Continued)

*Primary Examiner* — John J Lee (57) ABSTRACT

Apparatus having corresponding computer-readable media comprise: a first transceiver, wherein the first transceiver includes a receiver configured to receive a first message from a first device, wherein the first message includes a location of the first device, and a transmitter configured to transmit a second message, wherein the second message includes the location of the first device, and a request for a frequency allocation based on the location of the first device; wherein the receiver is further configured to receive a third message, wherein the third message includes the frequency allocation; and a second transceiver configured to wirelessly communicate on a frequency band indicated by the frequency allocation.

17 Claims, 6 Drawing Sheets

(56) References Cited

U.S. PATENT DOCUMENTS

| | | |
|---|---|---|
| 6,721,018 B1 | 4/2004 | Shintani et al. |
| 7,440,391 B2 | 10/2008 | Geile et al. |
| 8,626,220 B2 * | 1/2014 | Wang et al. .................. 455/509 |
| 8,867,481 B2 | 10/2014 | Lambert et al. |
| 2002/0159513 A1 | 10/2002 | Williams et al. |
| 2005/0159109 A1 | 7/2005 | Kivekas et al. |
| 2006/0217098 A1 | 9/2006 | Anderson et al. |
| 2007/0201503 A1 | 8/2007 | Nishio |
| 2007/0218851 A1 | 9/2007 | Soe et al. |
| 2008/0020791 A1 | 1/2008 | Ito et al. |
| 2008/0273479 A1 | 11/2008 | Kwak et al. |
| 2008/0311851 A1 * | 12/2008 | Hansen et al. ............... 455/41.2 |
| 2009/0196163 A1 | 8/2009 | Du |
| 2012/0163309 A1 | 6/2012 | Ma et al. |
| 2012/0201213 A1 | 8/2012 | Banerjea et al. |
| 2012/0202510 A1 * | 8/2012 | Singh .......................... 455/452.1 |
| 2014/0120975 A1 * | 5/2014 | Liu et al. ....................... 455/509 |

FOREIGN PATENT DOCUMENTS

| | | |
|---|---|---|
| WO | WO2006016330 | 2/2006 |
| WO | WO2010068629 | 6/2010 |
| WO | WO-2012122119 A1 | 9/2012 |

OTHER PUBLICATIONS

Stevenson, C. "IEEE 802.22: The First Cognative Radio Wireless Regional Area Network Standard." IEEE Communications Magazine 44.1 (Jan. 1, 2009): 130-38.

U.S. Appl. No. 13/369,102, filed Feb. 2011, Banerjea et al.

* cited by examiner

ASSISTED LOCATION-BASED WIRELESS SPECTRUM ALLOCATION

CROSS-REFERENCE TO RELATED APPLICATIONS

This disclosure claims the benefit of U.S. Provisional Patent Application Ser. No. 61/452,475, filed on Mar. 14, 2011, entitled "Wireless Location Assignment," the disclosure thereof incorporated by reference herein in its entirety.

This disclosure is related to the following U.S. patent applications:

U.S. Provisional Patent Application No. 61/444,590, filed on Feb. 18, 2011, entitled "Dynamic Channel Allocation";

U.S. Provisional Patent Application No. 61/451,310, filed on Mar. 10, 2011, entitled "Dynamic Channel Allocation";

U.S. Provisional Patent Application Ser. No. 61/440,814, filed on Feb. 8, 2011, entitled "IEEE 802.11 af";

U.S. Provisional Patent Application Ser. No. 61/443,185, filed on Feb. 15, 2011, entitled "IEEE 802.11 af"; and U.S. Non-Provisional patent application Ser. No. 13/369,102, filed on Feb. 8, 2011, entitled "WLAN CHANNEL ALLOCATION".

The disclosures of all of the above-referenced patent applications are hereby incorporated by reference herein in their entireties.

FIELD

The present disclosure relates generally to the field of wireless communications. More particularly, the present disclosure relates to the allocation of location-based spectrum for wireless communications.

BACKGROUND

Wireless spectrum has historically been allocated in a fixed manner. For example, a government agency may allocate a particular frequency band to a particular TV channel in a particular city while prohibiting others from using that band in that city. This fixed allocation typically persists until another allocation is made.

Now some wireless spectrum is being made available for wireless communications using temporary location-based allocations. That is, this spectrum will be assigned by request based on the location of the requesting wireless device. This type of spectrum is often referred to as "white space." For example, the broadcast TV channels that became available with the switch from analog to digital TV broadcasting are often referred to as "TV white space." TV white space offers much higher bandwidth than Wi-Fi, and is expected to support "smart appliances" and other smart devices that communicate over white space channels. For example, a user might employ white space channels to remotely monitor and control appliances such as TV sets, hot water heaters, and the like.

Figure 1:
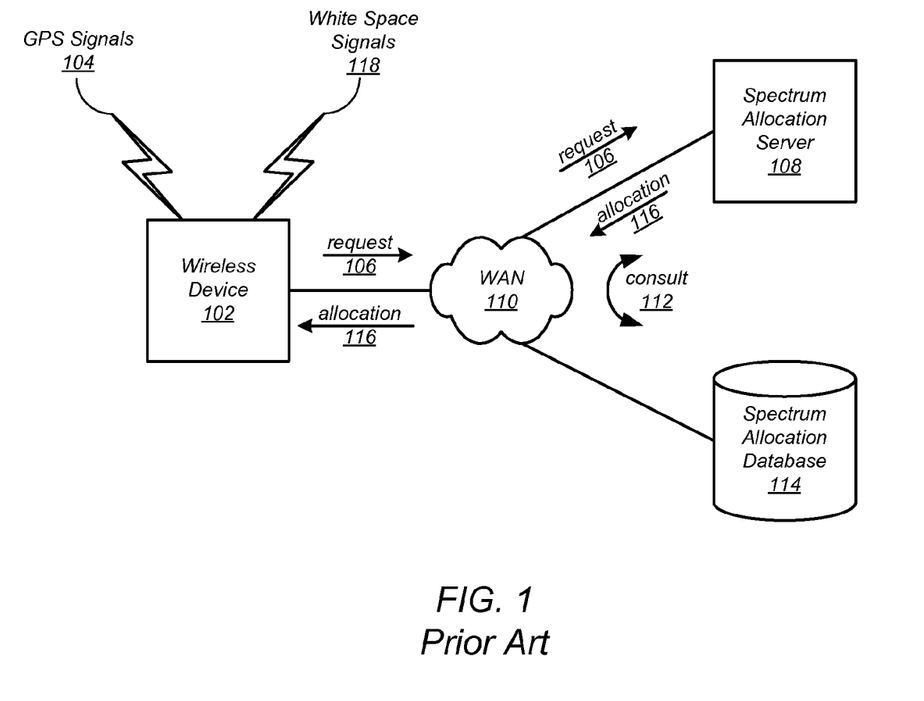
FIG. 1 illustrates a conventional white space allocation process according to the prior art.

FIG. 1 illustrates a conventional white space allocation process. Referring to FIG. 1, a wireless device 102 determines its location using GPS signals 104, and then sends a request 106 for white space allocation to a spectrum allocation server 108, for example over a wide-area network (WAN) 110 such as the Internet. Request 106 includes the location of wireless device 102. At 112, server 108 consults a spectrum allocation database 114 to obtain an available frequency band (also referred to herein as a "channel") based on the location of wireless device 102. At 116 server 108 allocates the white space channel to wireless device 102. Wireless device 102 can then communicate wirelessly over the allocated white space channel at 118.

In the conventional location-based wireless spectrum allocation of FIG. 1, wireless device 102 must determine its location. FCC regulations for television white space mandate that Mode II devices have geolocation capabilities such as GPS receivers for this purpose. However, not all devices that could utilize white space will have such geolocation capabilities. It may be too expensive to place GPS receivers in cost-sensitive consumer devices that are not mobile. For example, a television set is stationary and would not normally be built with GPS facilities. Adding a GPS receiver to a television set is too expensive just to enable white space usage. In addition, an indoor device such as a television set may be shielded from GPS satellites, and so the television set would be unable to obtain its location.

Alternatively, FCC regulations require fixed devices be "professionally installed" where a licensed installer configures the location in the wireless device 102. However, this method is very expensive, and does not allow any movement of the wireless device, even from one room to another.

SUMMARY

In general, in one aspect, an embodiment features an apparatus comprising: a first transceiver, wherein the first transceiver includes a receiver configured to receive a first message from a first device, wherein the first message includes a location of the first device, and a transmitter configured to transmit a second message, wherein the second message includes the location of the first device, and a request for a frequency allocation based on the location of the first device; wherein the receiver is further configured to receive a third message, wherein the third message includes the frequency allocation; and a second transceiver configured to wirelessly communicate on a frequency band indicated by the frequency allocation.

In general, in one aspect, an embodiment features computer-readable media embodying instructions executable by a computer to perform functions comprising: obtaining a location of a device from a first message received by a first transceiver of the device; causing the first transceiver to transmit a second message, wherein the second message includes an indication of the location of the device, and a request for a frequency allocation based on the location of the device; obtaining the frequency allocation from a third message received by the first transceiver; and configuring a second transceiver to wirelessly communicate on a frequency band indicated by the frequency allocation.

In general, in one aspect, an embodiment features computer-readable media embodying instructions executable by a computer to perform functions comprising: determining a location of the computer; causing a transceiver to wirelessly transmit a first message, wherein the first message includes an indication of the location of the computer, wherein causing the transceiver to wirelessly transmit the first message includes causing the transceiver to wirelessly transmit the first message in response to a second message received by the transceiver, wherein the second message includes a request for the location of the computer.

The details of one or more implementations are set forth in the accompanying drawings and the description below. Other features will be apparent from the description and drawings, and from the claims.

DESCRIPTION OF DRAWINGS

The leading digit(s) of each reference numeral used in this specification indicates the number of the drawing in which the reference numeral first appears.

DETAILED DESCRIPTION

Embodiments of the present disclosure provide assisted location-based wireless spectrum allocation for wireless devices that do not have geolocation capabilities. For clarity this spectrum is referred to herein as "white space," and the wireless device obtaining a channel allocation in the white space and communicating over the allocated white space channel is referred to as a "white space device." However, the disclosed embodiments apply to any wireless spectrum allocated based of the location of the wireless device.

As used herein, the term "server" generally refer to an electronic device or mechanism, and the terms "message," "request," "response," and the like generally refer to an electronic signal representing a digital message. As used herein, the term "mechanism" refers to hardware, software, or any combination thereof. These terms are used to simplify the description that follows. The servers and mechanisms described herein can be implemented on any standard general-purpose computer, or can be implemented as specialized devices. Furthermore, while some embodiments are described with reference to a client-server paradigm, other embodiments employ other paradigms, such as peer-to-peer paradigms and the like.

In the disclosed embodiments, one or more "assistant" devices having geolocation capabilities provides location information to the white space device. The white space device then uses this location information to obtain a white space channel allocation. Once the white space device is allocated a white space channel, the white space device can communicate wirelessly over that channel.

Figure 2:
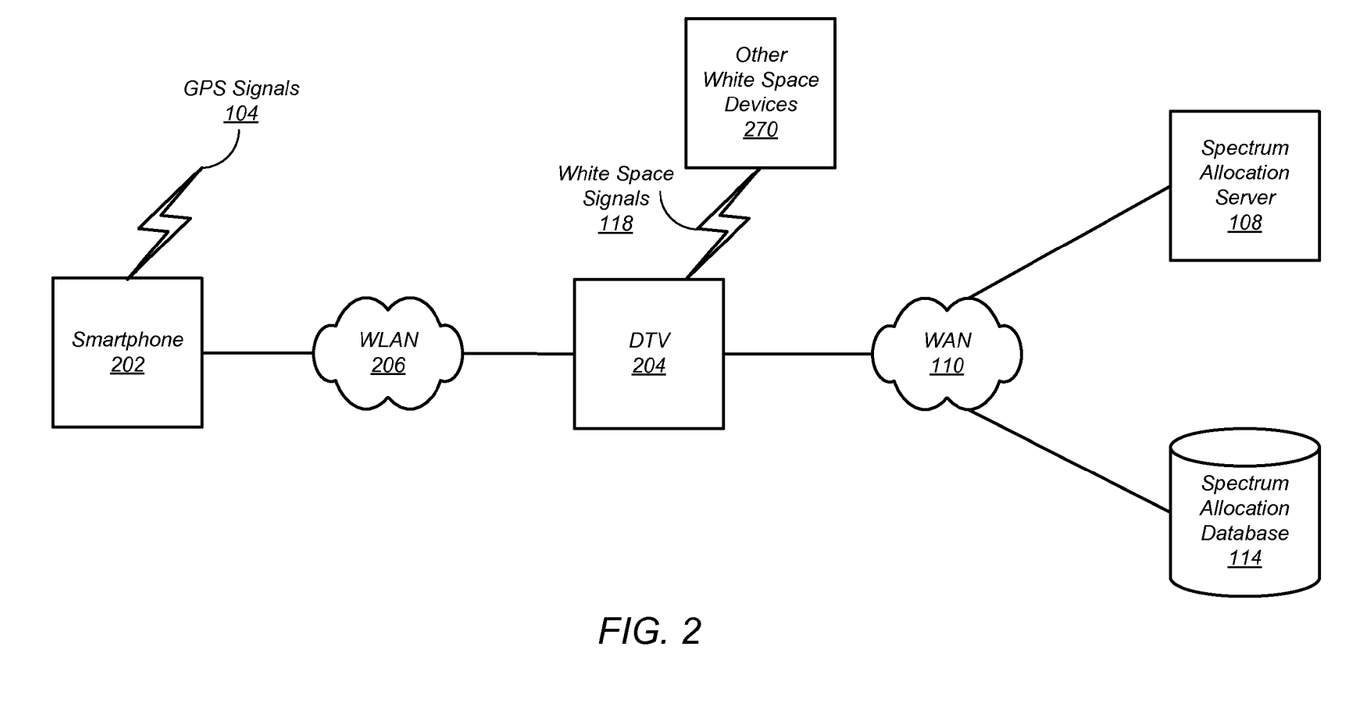
FIG. 2 illustrates a white space allocation system according to the principles of the present disclosure.

FIG. 2 shows an embodiment where the white space device is a digital television set and the assistant device is a smartphone. Although in the described embodiments the elements of FIG. 2 are presented in one arrangement, other embodiments may feature other arrangements. For example, the elements of FIG. 2 can be implemented in hardware, software, or combinations thereof.

Referring to FIG. 2, digital television set (DTV) 204 has no geolocation capability, but has the capability to communicate wirelessly over white space channels with other nearby white space devices 270. Smartphone 202 has geolocation capabilities, for example using GPS signals 104. Smartphone 202 can communicate its location to DTV 204, for example using a wireless local-area network (WLAN) 206. After obtaining the location, DTV 204 can operate as an FCC Mode II device. That is, DTV 204 can obtain a white space channel allocation from a spectrum allocation server 108 and a spectrum allocation database 114 over a wide-area network (WAN) 110 according to conventional techniques such as those described above with reference to FIG. 1.

Figure 3:
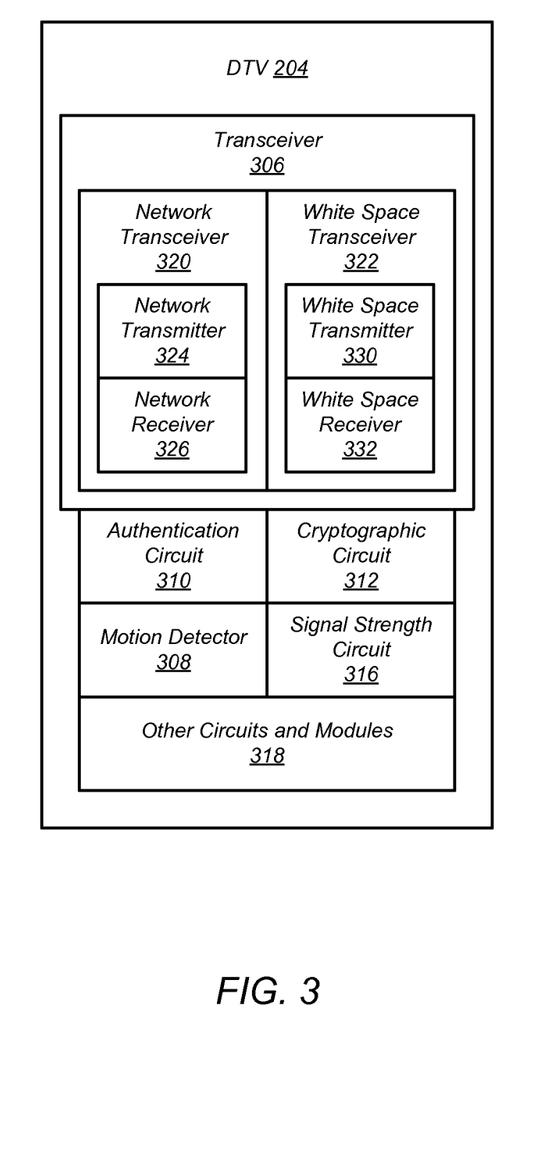
FIG. 3 illustrates a digital television according to the principles of the present disclosure.

FIG. 3 shows detail of DTV 204 according to one embodiment. Although in the described embodiments the elements of FIG. 3 are presented in one arrangement, other embodiments may feature other arrangements. For example, the elements of FIG. 3 can be implemented in hardware, software, or combinations thereof.

DTV 204 includes a transceiver 306, a motion detector 308, an authentication circuit 310, a cryptographic circuit 312, and a signal strength circuit 316. Authentication circuit 310 and cryptographic circuit 312 can be implemented as separate circuits or as one or more processors. Signal strength circuit 316 can be implemented as part of transceiver 306. DTV 204 also includes other circuits and modules 318 such as a digital television receiver, display, speakers, remote control interface, a processor, and the like.

Transceiver 306 includes a network transceiver 320 to support wireless and/or wired network communications such as Internet Protocol communications and a white space transceiver 322 to support wireless communications over white space channels. Network transceiver 320 includes a network transmitter 324 and a network receiver 326. White space transceiver 322 includes a white space transmitter 330 and a white space receiver 332. Transceivers 320 and 322 can be implemented together, separately, or with one or more circuits in common.

Figure 4:
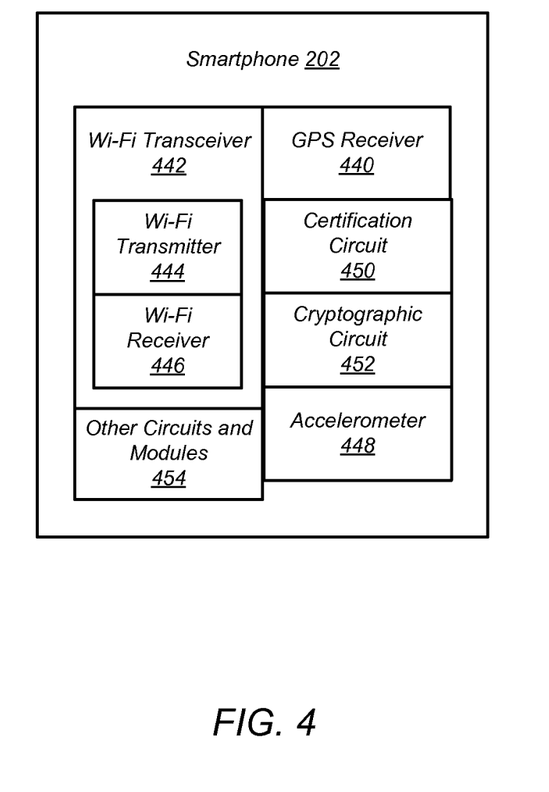
FIG. 4 illustrates a smartphone according to the principles of the present disclosure.

FIG. 4 shows detail of smartphone 202 according to one embodiment. Although in the described embodiments the elements of FIG. 4 are presented in one arrangement, other embodiments may feature other arrangements. For example, the elements of FIG. 4 can be implemented in hardware, software, or combinations thereof.

Smartphone 202 includes a GPS receiver 440 that provides geolocation capabilities based on received GPS signals 438. Smartphone 202 also includes a Wi-Fi transceiver 442 for wireless network communications. Wi-Fi transceiver 442 includes a Wi-Fi transmitter 444 and a Wi-Fi receiver 446. Smartphone 202 also includes an accelerometer 448, a certification circuit 450, and a cryptographic circuit 452. Certification circuit 450 and cryptographic circuit 452 can be implemented as separate circuits or as one or more processors. Smartphone 202 also includes other circuits and modules 454 such as a wireless phone transceiver for communications over a wireless phone network, a display, a speaker, a control interface, a processor, and the like.

Figure 5:
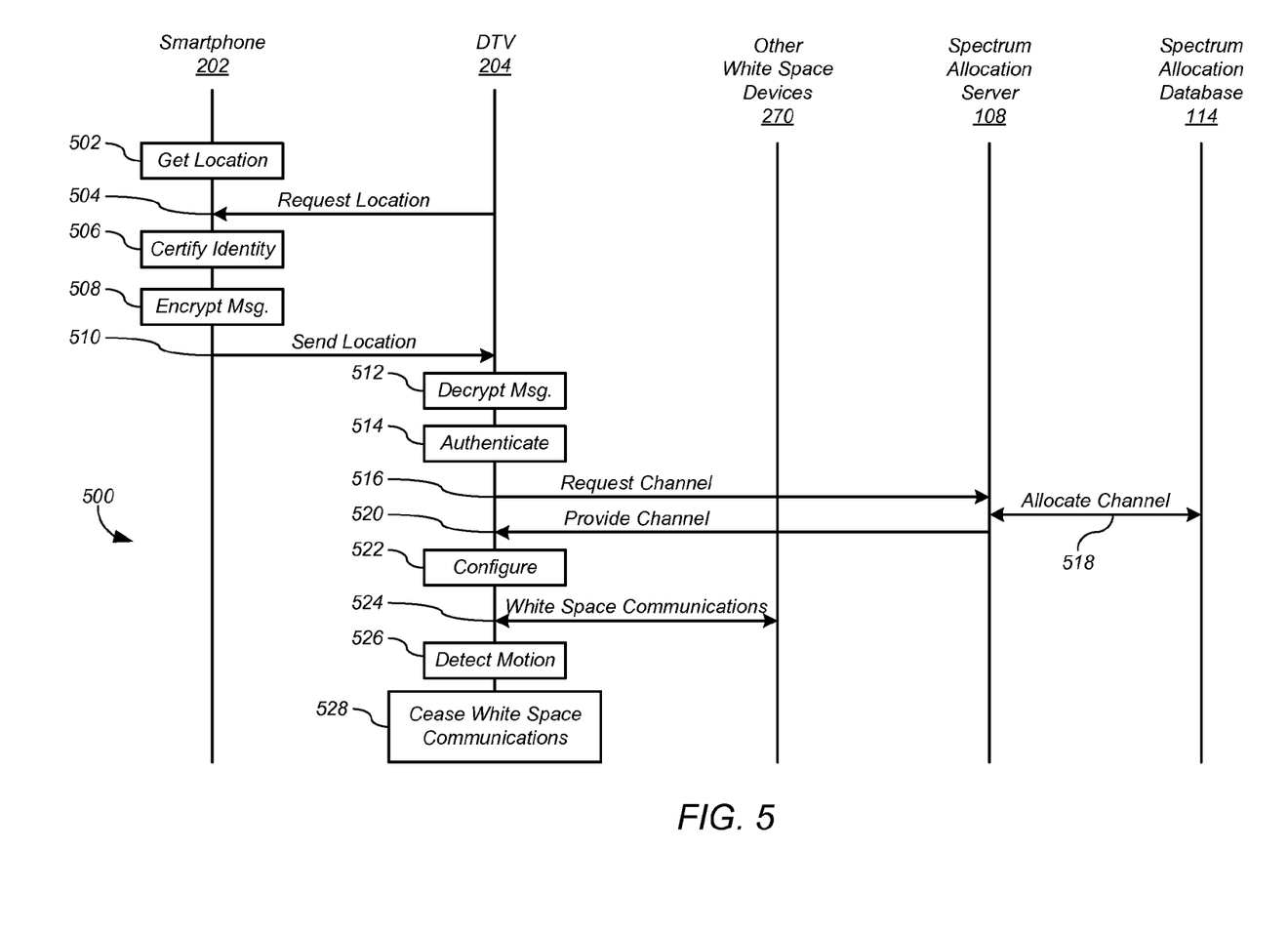
FIG. 5 illustrates a spectrum allocation process according to the principles of the present disclosure.

FIG. 5 shows a process 500 for the embodiments of FIGS. 2-4 according to one embodiment. Although in the described embodiments the elements of process 500 are presented in one arrangement, other embodiments may feature other arrangements. For example, in various embodiments, some or all of the elements of process 500 can be executed in a different order, concurrently, and the like. Also some elements of process 500 may not be performed, and may not be executed immediately after each other.

Process 500 generally begins with smartphone 202 obtaining its location at 502. In the embodiment of FIG. 2, smartphone 202 includes a GPS receiver 440 to determine the location of smartphone 202 based on GPS signals 104 received by smartphone 202. In order to use GPS positioning, signals 104 must not be blocked or overly attenuated. In general, this means that the position must be determined outside of any building in which DTV 204 is located. For small buildings, the difference between the locations of smartphone 202 and DTV 204 may be insignificant for the purposes of obtaining a white space channel allocation. However, in other cases, for example when DTV 204 is located deep inside a large building, the location difference may have to be accounted for. In such situations, smartphone 202 can include an accelerometer 448 or the like to measure the distance and direction between a previously-determined location of smartphone 202 and the location of DTV 204. From this information, smartphone 202 can provide a good estimate of the location of DTV 204.

Smartphone 202 then provides location information to DTV 204. In the embodiment of FIG. 5, this process is initiated by a request from DTV 204. However, other methods can be used. In some embodiments, smartphone 202 executes an application that provides the location information to DTV 204. For example, the application can be provided by the manufacturer of DTV 204.

Referring again to FIG. 5, at 504 smartphone 202 receives a message from DTV 204 that requests the location of DTV 204. In the embodiment of FIG. 2, this request is sent by Wi-Fi from network transmitter 324 of DTV 204 to Wi-Fi receiver 446 of smartphone 202. However, other methods of communication can be used.

In response to the request, smartphone 202 sends a message to DTV 204 at 510 that includes the location information. In the described embodiments, the location information includes the latitude and longitude of smartphone 202. However, the location information can take other forms, and can include other parameters such as altitude and the like.

To prevent fraud in obtaining white space channel allocations, the message can be cryptographically bound. Therefore at 506 certification circuit 450 of smartphone 202 certifies the message before transmission. That is, certification circuit 450 provides proof of the identity of smartphone 202 or the user of smartphone 202. For example, certification circuit 450 digitally signs the message. However, other certification methods can be used instead. As a further security measure, cryptographic circuit 452 of smartphone 202 encrypts the message at 508 before transmission. Various embodiments can employ symmetric key cryptography, asymmetric key cryptography, and the like.

The message containing the location information is sent by Wi-Fi from Wi-Fi transmitter 444 of smartphone 202 to network receiver 326 of DTV 204 at 510. However, other methods of communication can be used. Cryptographic circuit 312 of DTV 204 decrypts the message at 512. Authentication circuit 310 of DTV 204 authenticates the message at 514. For example, authentication circuit 310 verifies a digital signature used to sign the message. At this point DTV 204 has the location information for smartphone 202.

In some cases, DTV 204 receives responses from multiple devices at 510. For example, if multiple smartphones 202 are within Wi-Fi range of DTV 204, then two or more of the smartphones 202 may respond. In some embodiments, DTV 204 selects one of the smartphones 202 to obtain the most accurate position estimate. In one such embodiment, DTV 204 employs signal strength circuit 316 to select the strongest signal, which should originate from the nearest smartphone 202. DTV 204 then takes the location information provided in the selected signal. In other embodiments, DTV 204 combines location information from two or more smartphones 202 to obtain a location estimate for DTV 204.

DTV 204 then sends a request for a frequency allocation to spectrum allocation server 108 at 516. The request includes the location of smartphone 202. In particular, network transmitter 324 of DTV 204 sends the request to spectrum allocation server 108 over network 110.

At 518 spectrum allocation server 108 selects a white space channel by indexing spectrum allocation database 114 using the location of smartphone 202. For example, spectrum allocation database 114 can list the current frequency allocations at the location of smartphone 202, and spectrum allocation server 108 chooses a channel that is not currently allocated for that location.

At 520 spectrum allocation server 108 sends a message to DTV 204. Network receiver 326 of DTV 204 receives the message. The message indicates the white space channel allocated to DTV 204 by spectrum allocation server 108. In some embodiments, for further security, communications between DTV 204 and spectrum allocation server 108 are certified/authenticated and/or encrypted.

At 522 DTV 204 configures white space transceiver 322 to use the white space channel allocated to DTV 204 by spectrum allocation server 108. At 524 white space transceiver 322 wirelessly communicates with other white space devices 270 using wireless white space signals 118 over the white space channel allocated to DTV 204 by spectrum allocation server 108.

The white space channel allocation is valid only for the location provided by DTV 204 in the spectrum allocation request. So if moved from that location, DTV 204 is no longer allowed to communicate over that white space channel. To enforce this restriction, in the embodiment of FIG. 4, DTV 204 includes a motion detector 308. At 526 motion detector 308 indicates that DTV 204 has moved. At 528, in response to the motion detection, white space transceiver 322, including white space receiver 332 and white space transmitter 330, ceases wirelessly communicating on the allocated white space channel. When motion detector 308 indicates that DTV 204 is once again stationary, process 500 can begin again to obtain a new white space channel allocation for DTV 204. DTV 204 can also consider the length of time during which motion is detected. For example if someone bumped into DTV 204 or moved DTV 204 from one room to another, the motion would not last long and so should not trigger white space channel allocation process 500 again.

Figure 6:
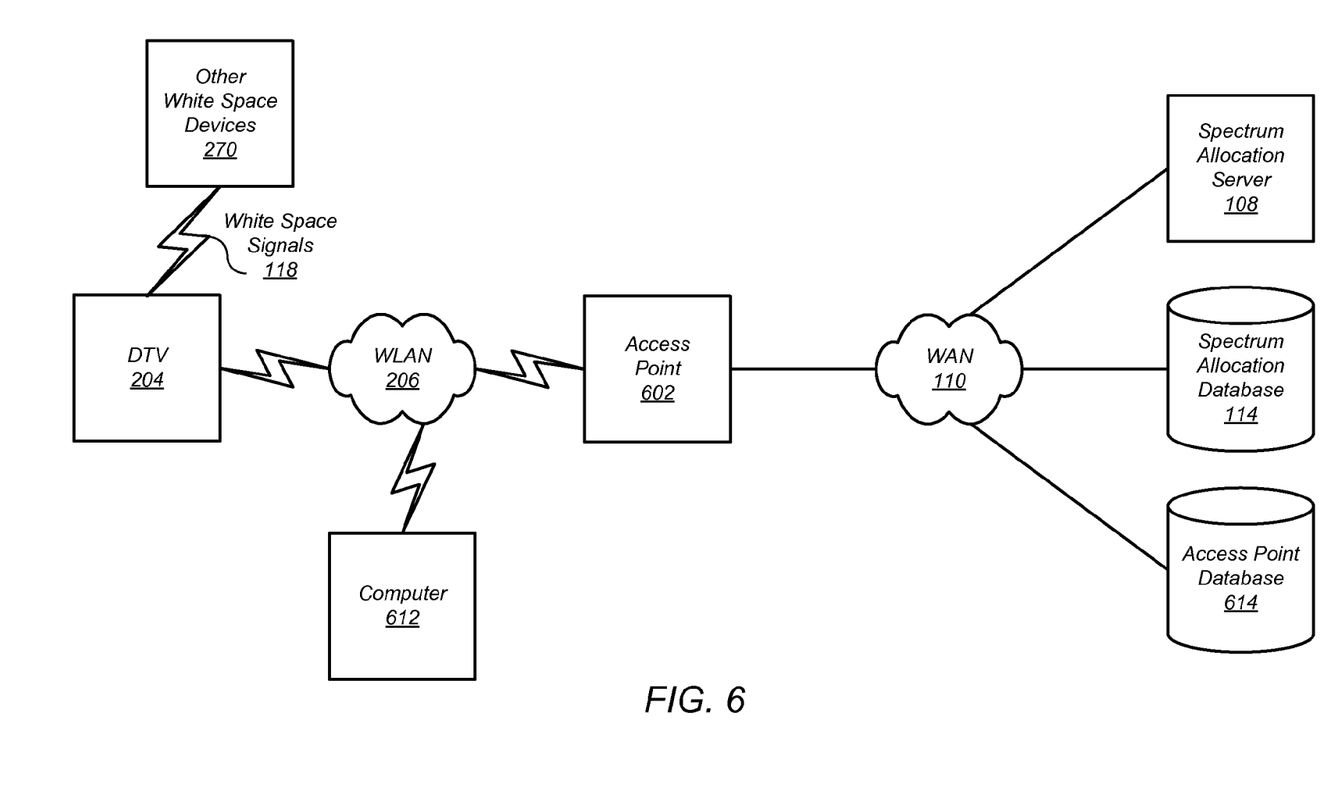
FIG. 6 illustrates a white space allocation system including an access point according to the principles of the present disclosure.

In the embodiment of FIG. 2, the assistant device is a smartphone 202. In other embodiments, other sorts of devices act as assistant devices to provide location information to white space devices. FIG. 6 shows an embodiment where the assistant device is an access point 602 in a wireless local-area network (WLAN) 606. Although in the described embodiments the elements of FIG. 6 are presented in one arrangement, other embodiments may feature other arrangements. For example, the elements of FIG. 6 can be implemented in hardware, software, or combinations thereof.

Access point 602 can learn its location from an access point database 614 that lists locations of access points. Such access point databases 614 have been compiled and are currently in use, for example by Internet service providers. Access point 602 can then provide the location information to nearby white space devices such as DTV 204. A computer 612 can perform this function instead, or in conjunction with access point 602.

In the embodiment of FIG. 2, the white space device is a DTV 204. However, it will be appreciated that the white space device can be any sort of device that is capable of white space communications. Such devices can include other electronic devices, appliances, thermostats, automobiles, and so on.

In the embodiment of FIG. 2, smartphone 202 employs GPS signals to determine its location. However, assistant devices can use any method to determine their location. For example, other satellite positioning systems are planned. Terrestrial transmitters can be used instead or in combination with such satellite systems.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. An apparatus comprising:
   a first transceiver, wherein the first transceiver includes
      a receiver configured to receive a first message from a first device, wherein the first message includes a location of the first device, and
      a transmitter configured to transmit, to a spectrum allocation server over a wide area network, a second message, wherein the second message includes
         the location of the first device, and
         a request for a frequency allocation for the apparatus based on the location of the first device;
   wherein the receiver is further configured to receive a third message from the spectrum allocation server, wherein the third message includes the frequency allocation for the apparatus; and
   a second transceiver configured to wirelessly communicate on a frequency band indicated by the frequency allocation.

2. The apparatus of claim 1, wherein:
   the transmitter is further configured to wirelessly transmit a fourth message, wherein the fourth message includes a request for the location of the first device.

3. The apparatus of claim 1, wherein the first device is selected from the group consisting of:
   a smartphone;
   an access point; and
   a computer.

4. An apparatus, comprising:
   a first transceiver, wherein the first transceiver includes
      a receiver configured to receive a first message from a first device, wherein the first message includes a location of the first device, and
      a transmitter configured to transmit a second message, wherein the second message includes
         the location of the first device, and
         a request for a frequency allocation based on the location of the first device;
   wherein the receiver is further configured to receive a third message, wherein the third message includes the frequency allocation; and
   a second transceiver configured to wirelessly communicate on a frequency band indicated by the frequency allocation,
   wherein the first message is certified, and wherein the apparatus further comprises:
   an authentication circuit configured to authenticate the first message based on the first message being certified.

5. The An apparatus, comprising:
   a first transceiver, wherein the first transceiver includes
      a receiver configured to receive a first message from a first device, wherein the first message includes a location of the first device, and
      a transmitter configured to transmit a second message, wherein the second message includes
         the location of the first device, and
         a request for a frequency allocation based on the location of the first device;
   wherein the receiver is further configured to receive a third message, wherein the third message includes the frequency allocation; and
   a second transceiver configured to wirelessly communicate on a frequency band indicated by the frequency allocation,
   wherein the first message is encrypted, and wherein the apparatus further comprises:
   a cryptographic circuit configured to decrypt the first message.

6. An apparatus, comprising:
   a first transceiver, wherein the first transceiver includes
      a receiver configured to receive a first message from a first device, wherein the first message includes a location of the first device, and
      a transmitter configured to transmit a second message, wherein the second message includes
         the location of the first device, and
         a request for a frequency allocation based on the location of the first device;
   wherein the receiver is further configured to receive a third message, wherein the third message includes the frequency allocation;
   a second transceiver configured to wirelessly communicate on a frequency band indicated by the frequency allocation; and
   a motion detector,
   wherein the second transceiver is further configured to cease wirelessly communicating on the frequency band indicated by the frequency allocation in response to the motion detector indicating that the apparatus has been moved.

7. An apparatus, comprising:
   a first transceiver, wherein the first transceiver includes
      a receiver configured to receive a first message from a first device, wherein the first message includes a location of the first device, and a transmitter configured to transmit a second message,
wherein the second message includes
the location of the first device, and
a request for a frequency allocation based on the location of the first device:
wherein the receiver is further configured to receive a third message, wherein the third message includes the frequency allocation; and
a second transceiver configured to wirelessly communicate on a frequency band indicated by the frequency allocation,
wherein the receiver is further configured to receive wireless signals from a plurality of devices, and wherein the apparatus further comprises:
a signal strength circuit configured to measure signal strengths of the received wireless signals,
wherein the receiver is further configured to select the first device according to the measured signal strengths of the received wireless signals.

8. Non-transitory computer-readable media embodying instructions executable by a computer to perform functions comprising:
at a first device, obtaining a location of a second device from a first message received by a first transceiver of the first device;
causing the first transceiver to transmit, to a spectrum allocation server over a wide area network, a second message, wherein the second message includes
an indication of the location of the second device, and
a request for a frequency allocation for the first device based on the location of the second device;
obtaining the frequency allocation for the first device from a third message received by the first transceiver from the spectrum allocation server; and
configuring a second transceiver of the first device to wirelessly communicate with another device on a frequency band indicated by the frequency allocation.

9. The non-transitory computer-readable media of claim 8, wherein the functions further comprise:
causing the first transceiver of the first device to transmit a fourth message, wherein the fourth message includes a request for the location of the first device.

10. The non-transitory computer-readable media of claim 8, embodying instructions executable by a computer to perform functions comprising:
obtaining a location of a device from a first message received by a first transceiver of the device;
causing the first transceiver to transmit a second message, wherein the second message includes
an indication of the location of the device, and
a request for a frequency allocation based on the location of the device;
obtaining the frequency allocation from a third message received by the first transceiver; and
configuring a second transceiver to wirelessly communicate on a frequency band indicated by the frequency allocation,
wherein:
the first message is encrypted; and
the functions further comprise decrypting the first message.

11. The non-transitory computer-readable media of claim 8, embodying instructions executable by a computer to perform functions comprising:
obtaining a location of a device from a first message received by a first transceiver of the device;
causing the first transceiver to transmit a second message, wherein the second message includes
an indication of the location of the device, and
a request for a frequency allocation based on the location of the device;
obtaining the frequency allocation from a third message received by the first transceiver; and
configuring a second transceiver to wirelessly communicate on a frequency band indicated by the frequency allocation,
wherein the functions further comprise:
causing the second transceiver to cease wirelessly communicating on the frequency band indicated by the frequency allocation in response to a motion detector indicating that the computer has been moved.

12. The non-transitory computer-readable media of claim 8, embodying instructions executable by a computer to perform functions comprising:
obtaining a location of a device from a first message received by a first transceiver of the device;
causing the first transceiver to transmit a second message, wherein the second message includes
an indication of the location of the device, and
a request for a frequency allocation based on the location of the device;
obtaining the frequency allocation from a third message received by the first transceiver; and
configuring a second transceiver to wirelessly communicate on a frequency band indicated by the frequency allocation,
wherein the functions further comprise:
selecting the device from among a plurality of the devices according to received signal strengths of wireless signals transmitted by the devices.

13. The Non-transitory computer-readable media embodying instructions executable by a computer to perform functions comprising:
obtaining a location of a device from a first message received by a first transceiver of the device;
causing the first transceiver to transmit a second message, wherein the second message includes
an indication of the location of the device, and
a request for a frequency allocation based on the location of the device;
obtaining the frequency allocation from a third message received by the first transceiver; and
configuring a second transceiver to wirelessly communicate on a frequency band indicated by the frequency allocation,
wherein:
the first message is certified; and
the functions further comprise authenticating the first message based on the first message being certified.

14. Non-transitory computer-readable media embodying instructions executable by a computer to perform functions comprising:
determining a location of the computer;
causing a transceiver to wirelessly transmit a first message, wherein the first message includes an indication of the location of the computer,
wherein causing the transceiver to wirelessly transmit the first message includes causing the transceiver to wirelessly transmit the first message in response to a second message received by the transceiver, wherein the second message includes a request for the location of the computer, and wherein the functions further comprise:

encrypting the first message prior to causing the transceiver to wirelessly transmit the first message.

15. The non-transitory computer-readable media of claim 14, wherein the functions further comprise:
certifying the first message prior to causing the transceiver to wirelessly transmit the first message.

16. The non-transitory computer-readable media of claim 14, wherein determining the location of the computer comprises:
determining the location of the computer based on a global positioning system (GPS) signal received by the transceiver.

17. The non-transitory computer-readable media of claim 14, wherein determining the location of the computer comprises:
determining the location of the computer based on
signals provided by an accelerometer, and
a previously-determined location of the computer.

\* \* \* \* \*